No. 635,976. Patented Oct. 31, 1899.
J. C. POTTER & J. JOHNSTON.
LATHE CHUCK.
(Application filed Nov. 17, 1898.)

(No Model.) 2 Sheets—Sheet 1.

WITNESSES:
Chas. H. Luther Jr
B. M. Simms

INVENTORS:
James C. Potter &
John Johnston
by Joseph A. Miller & Co.
Attys.

THE NORRIS PETERS CO., PHOTO-LITHO., WASHINGTON, D. C.

No. 635,976. Patented Oct. 31, 1899.
J. C. POTTER & J. JOHNSTON.
LATHE CHUCK.
(Application filed Nov. 17, 1898.)
(No Model.) 2 Sheets—Sheet 2.
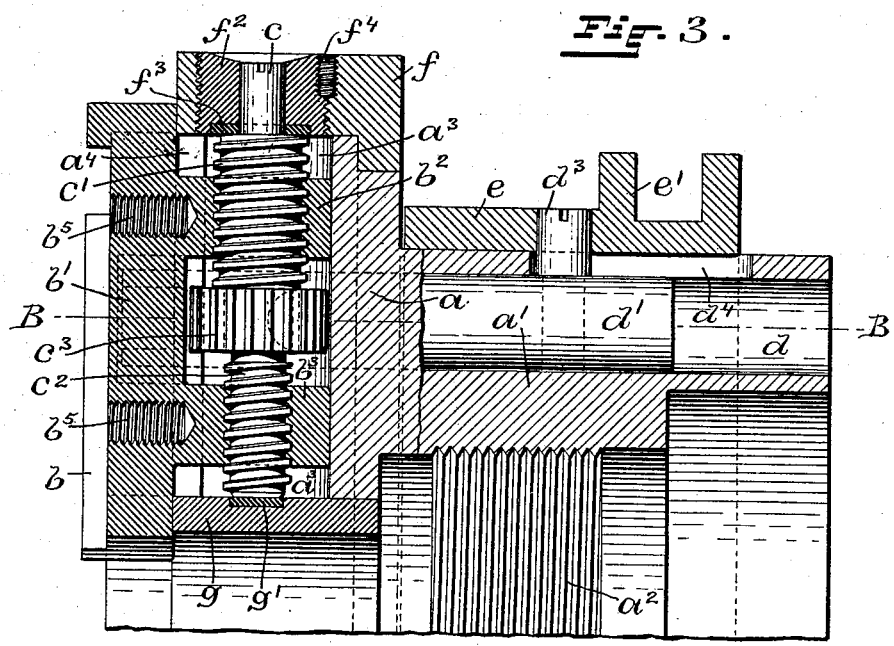
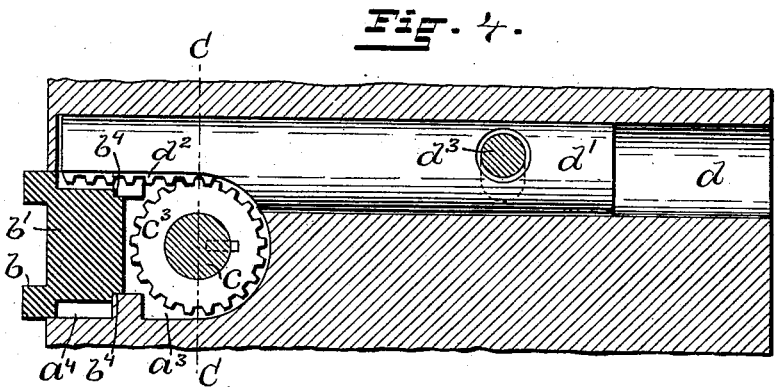
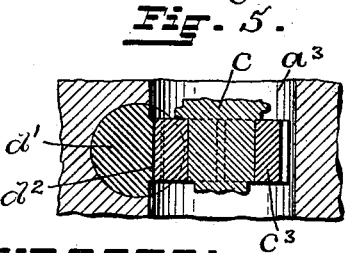
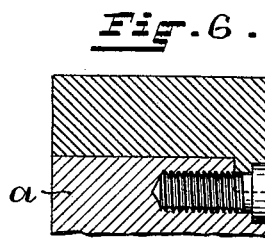
WITNESSES: Chas. H. Luther Jr. B. M. Simms
INVENTORS: James C. Potter and John Johnston by Joseph A. Miller & Co. Attys.
THE NORRIS PETERS CO., PHOTO-LITHO., WASHINGTON, D. C.

UNITED STATES PATENT OFFICE.

JAMES CHARLES POTTER AND JOHN JOHNSTON, OF PAWTUCKET, RHODE ISLAND, ASSIGNORS TO THE POTTER & JOHNSTON COMPANY, OF SAME PLACE.

LATHE-CHUCK.

SPECIFICATION forming part of Letters Patent No. 635,976, dated October 31, 1899.

Application filed November 17, 1898. Serial No. 696,673. (No model.)

*To all whom it may concern:*

Be it known that we, JAMES CHARLES POTTER and JOHN JOHNSTON, of Pawtucket, in the county of Providence and State of Rhode Island, have invented a new and useful Improvement in Lathe-Chucks; and we hereby declare that the following is a full, clear, and exact description of the same, reference being had to the accompanying drawings, forming part of this specification.

The invention has reference to an improvement in a chuck adapted to be secured to the mandrel of a lathe and used to secure the work.

The invention consists in the peculiar and novel construction of the chuck and the mechanism for operating and adjusting the dogs whereby the same may be adjusted independent of each other, as will be more fully set forth hereinafter.

One object of the invention is to facilitate the operation of the dogs by which the work may be secured or released without stopping the lathe.

Another object of the invention is to facilitate the adjustment of the dogs and the uncoupling of the dog-operating mechanism.

Figure 1:
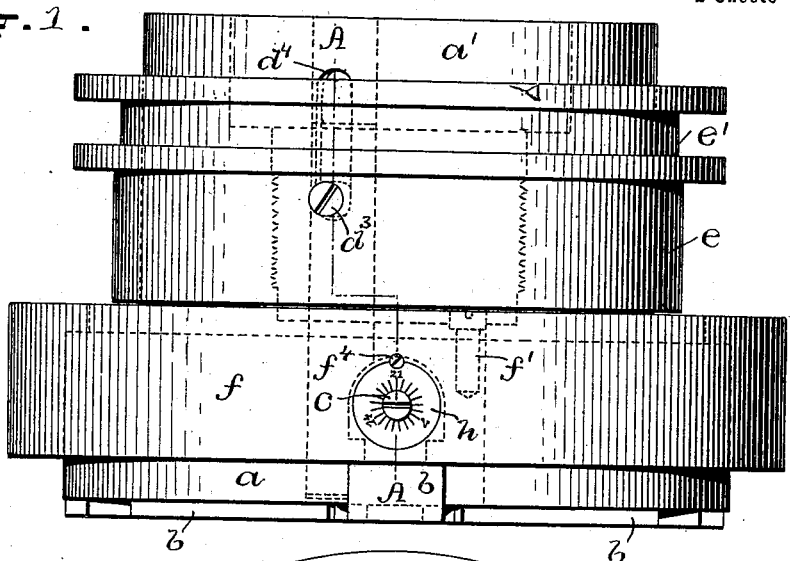
Figure 2:
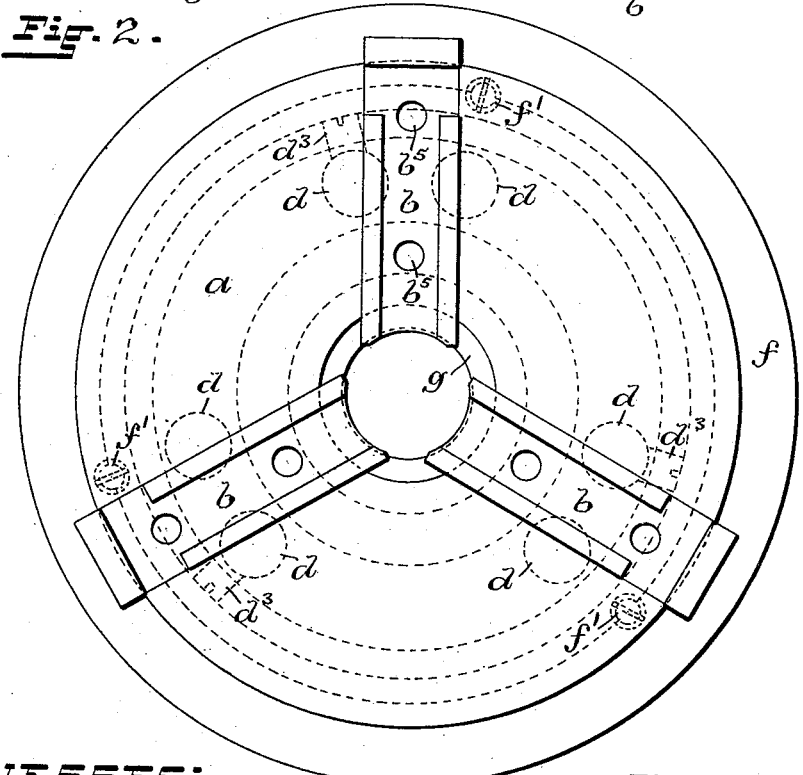

Figure 1 is a side view of our improved chuck. Fig. 2 is an end view of the same. Fig. 3 is a sectional view of part of the chuck on the line A A of Fig. 1. Fig. 4 is a sectional view of part of the chuck on the line B B of Fig. 3, showing the sliding rack-bar engaging with and operating the pinion. Fig. 5 is a sectional view of part of the chuck on the line C C of Fig. 4. Fig. 6 is a sectional view of part of the chuck, showing the manner of securing the outer ring to the main portion of the chuck. Figs. 3, 4, 5, and 6 are shown enlarged.

Similar marks of reference indicate corresponding parts in all the figures.

In the drawings, $a$ indicates the main body of the chuck, consisting of a circular disk, from the rear of which extends the hub $a'$, provided with the internal screw-thread $a^2$, by which the chuck is secured to the mandrel of the lathe. Into the disk $a$ three radially-disposed ducts or ways $a^3$ are bored or otherwise formed, which extend from the periphery of the disk $a$ to the central opening in the same. Through the face of the disk $a$ the slot $a^4$ is cut or formed, in which the dogs $b\ b\ b$ slide. The dogs consist of the bed $b'$ and the rearwardly-projecting brackets $b^2$ and $b^3$. The bed $b'$ is provided with rectangular grooves, which bear on the ways $b^4\ b^4$. The brackets $b^2$ and $b^3$ conform to the sectional shape of the duct $a^3$ and fit the same with a sliding fit. The dogs are provided with tapped holes $b^5\ b^5$, adapted to secure the required jaws to the dogs. Each dog is provided with the screw-spindle $c$, having a threaded screw $c'$ of large diameter engaging with the screw-threaded nut formed in the bracket $b^2$. A screw-thread $c^2$ of smaller diameter, formed near the opposite end, engages with the screw-threaded nut formed in the bracket $b^3$, and the pinion $c^3$ is secured by a spline to the screw-spindle $c$ between the two screw-threaded portions. The pitch of the two screw-threaded portions of the screw-spindle, although differing in diameter, is the same. The holes $d\ d$ extend on each side of the dogs $b\ b$ from the front to the rear of the chuck parallel with the axis of rotation of the chuck. The rack-bar $d'$, having at one end the rack $d^2$, is placed in one of the holes $d$ to engage with the pinion $c^3$ on one side or the other of the dog as the chuck may be used to hold the work by expanding or by contracting the same. The position of the parts indicated in the drawings is when the chuck is used as a contracting chuck.

In Fig. 2 the studs $d^3$ are indicated in broken lines connected with the rack-bars. The stud $d^3$, secured to the rack-bar $d'$, extends through the slot $d^4$ and connects the rack-bar with the sliding sleeve $e$, on which the shipper-groove $e'$ is formed and with which a shipper of the usual form engages to slide the sleeve $e$ on the hub $a'$, and with the sleeve the three rack-bars $d'\ d'$ to simultaneously operate the three radially-sliding dogs $b\ b$.

The ring $f$ is secured to the periphery of the disk $a$, which it fits closely, by the screw $f'$, as is shown in Fig. 6, three such screws $f'$ being preferably used to secure the ring $f$, as is indicated in Fig. 2. The ring $f$ is provided with three screw-plugs $f^2$, forming the journal-bearings of the screw-spindles $c$, and each plug is provided with a steel washer $f^3$, forming the thrust-bearing for the screw $c'$. The plugs $f^2$ are secured by the screws $f^4$, engaging partly with the screw-plugs and partly with the ring $f$. The ring $g$ is forced into the central opening in the disk $a$ and is provided at three points with the steel disks $g'$, which form the end thrust-bearings for the screw-spindle $c$.

In assembling the parts the pinion $c^3$ is held between the brackets $b^2$ and $b^3$ and the end of the screw-spindle $c$, provided with the screw of the smaller diameter $c^2$, is passed through the hole in the bracket $b^2$, and then through the hole in the pinion $c^3$. Then the screws $c'$ $c^2$ take into the respective screw-threads formed in the brackets $b^2$ and $b^3$ until the screw-spindle has passed sufficiently through the brackets to allow of the adjustment of the pinion $c^3$ in position to be held by the spline. The screw-spindle is then revolved until the pinion is brought in contact with the bracket $b^2$. The three dogs having been thus assembled are slipped into the ducts $a^3$, formed in the main body $a$ of the chuck, from the periphery until they meet in the center. The finishing-ring $f$, having been provided with the three screw-plugs $f^2$ and the steel washers $f^3$, is then passed over the main body $a$ and held in position by the screws $f'$. The dogs $b$ $b$ $b$, carrying the screw-spindle $c$, are then moved outward from the center to the periphery until the screw $c'$ abuts against the steel washers $f^3$ and the ends of the screw-spindles $c$ project through the holes in the respective screw-plugs $f^2$. The ring $g$, provided with the steel disks $g'$, is then forced into place, so that the ends of the screws $c^2$ abut against the disks $g'$. The dogs are now adjusted by turning the screw-spindle $c$, and to secure perfect adjustment we provide the index $h$ (shown in Fig. 1) with a series of equidistant radial lines, there being the same number of lines as there are teeth on the pinion, and the end of the screw-spindle $c$ with an index-mark, so that the exact position of the pinion relative to the brackets $b^2$ and $b^3$ is clearly indicated. The sleeve $e$ is now placed on the hub $a'$, the rack-bars $d'$ are placed in their respective holes $d$, and the studs $d^3$ are passed through the holes in the sleeve $e$, through the slots $d^4$, and screwed into the respective rack-bars $d'$.

Should it be desirable to adjust the chuck to larger or smaller work or for other reasons, the sleeve $e$ is moved back from the face of the chuck as far as the studs $d^3$ can be moved in the slots $d^4$, when it will be found that the racks $d^2$ are out of mesh with their respective pinions $c^3$, when by turning the screw-spindle $c$ any one or all of the dogs may be adjusted as desired, and by reason of the index and mark the teeth of the pinions will be in proper position, so that upon moving the sleeve $e$ forward or toward the face of the chuck, and with it the rack-bars $d'$, the racks $d^2$ will take into their respective pinions $c^3$ to properly move the dogs $b$, as desired.

By the use of the peculiar adjusting screw-spindle, the pinion secured to the screw-spindle, and the rack-bar the dogs are rigidly held in any position. They may be moved by the sliding sleeve operated by the shipper, and the clamping of the work and the release of the same are quickly effected by sliding the sleeve $e$ in one or the opposite direction.

Having thus described our invention, we claim as new and desire to secure by Letters Patent—

1. In a chuck, the combination with radial ducts and ways for the dogs and the dogs, of screw-spindles each having a pinion secured to the spindle, said screw-spindles being in screw-thread engagement with the dogs, of rack-bars each engaging with the pinion on one of the screw-spindles, means, substantially as described, for operating the rack-bars, and graduated indexes surrounding the end of the screw-spindle; whereby the several screw-spindles may be turned through a predetermined part of a revolution, or revolutions, and the dogs accurately adjusted, as described.

2. In a lathe-chuck, the combination with the disk $a$, provided with the ducts $a^3$ and the slots $a^4$ extending tangentially through the disk, and the hub $a'$, of the dogs $b$, the brackets $b^2$ and $b^3$ on the dogs fitting the ducts $a^3$ with a sliding fit, the screw-spindles $c$, the screw-threads $c'$ and $c^2$ of different diameter and the same pitch, the pinion $c^3$ connected with the screw-spindle, the rack-bars $d'$, the stud $d^3$, and the sleeve $e$ having the groove $e'$ adapted to be operated by a shipper; whereby the dogs may be operated to hold and release the work, as described.

3. In a lathe-chuck, the combination with the disk $a$, provided with the slots $a^4$, the hub $a'$ provided with the holes $d$ formed in the ducts $a^3$ extending tangentially through the disk $a$, of the dogs $b$, the brackets $b^2$ and $b^3$ on the dogs fitting the ducts $a^3$ with a sliding fit, the screw-spindle $c$ provided with the screws fitting the screws formed in the brackets $b^2$ and $b^3$, the pinion $c^3$ connected with the screw-spindle $c$, the rings $f$ and $g$, the rack-bars $d'$, the stud $d^3$, and the sleeve $e$ having the groove $e'$ adapted to be operated by a shipper; whereby the dogs may be operated to hold and release the work, as described.

4. In a lathe-chuck, the combination with the disk $a$, provided with the ducts $a^3$ and the slots $a^4$, the hub $a'$ provided with the holes $d$ formed in the hub, the rings $f$ and $g$, the washer $f^3$ and the disk $g'$, and the screw-plugs $f^2$, of the dogs $b$, the brackets $b^2$ and $b^3$ on the dogs fitting the ducts $a^3$ with a sliding fit, the screw-spindle $c$ provided with screw-threads formed to mesh into the screw-threads formed in the brackets $b^2$ and $b^3$, the pinion $c^3$ secured to the screw-spindle, the rack-bars $d'$, the studs $d^3$, and the sleeve $e$ having the groove $e'$ adapted to be operated by a shipper; whereby the dogs may be operated to hold and release the work, as described.

In witness whereof we have hereunto set our hands.

JAMES CHARLES POTTER.
JOHN JOHNSTON.

Witnesses:
B. M. SIMMS,
J. A. MILLER, Jr.